United States Patent
Babel et al.

(10) Patent No.: US 6,285,964 B1
(45) Date of Patent: Sep. 4, 2001

(54) MEASURING DEVICE FOR DETERMINING PHYSICAL AND/OR CHEMICAL PROPERTIES OF GASES, LIQUIDS AND/OR SOLIDS

(75) Inventors: Wolfgang Babel, Weil der Stadt; Detlev Wittmer, Maulbronn, both of (DE)

(73) Assignee: Endress + Hauser Conducta Gesellschaft fur Mess-und Regeltechnik mbH + Co., Gerlingen (DE)

( * ) Notice: Subject to any disclaimer, the term of this patent is extended or adjusted under 35 U.S.C. 154(b) by 0 days.

(21) Appl. No.: 09/210,626

(22) Filed: Dec. 14, 1998

(30) Foreign Application Priority Data

Dec. 13, 1997 (DE) .............................................. 197 55 516

(51) Int. Cl.⁷ .................................................. G01N 21/00
(52) U.S. Cl. ........................................... 702/121; 700/266
(58) Field of Search .............................. 702/121, 23, 30, 702/31, 12; 73/1.02; 700/266–267; 703/12; 707/103 R, 103 Y, 103, 103 Z

(56) References Cited

U.S. PATENT DOCUMENTS

| | | | |
|---|---|---|---|
| 4,620,284 | * | 10/1986 | Schnell et al. ........................ 702/28 |
| 4,719,582 | * | 1/1988 | Ishida et al. ......................... 702/27 |
| 5,402,333 | * | 3/1995 | Cardner ............................... 700/31 |
| 5,463,564 | * | 10/1995 | Agrafiotis et al. .................. 700/268 |
| 5,571,401 | * | 11/1996 | Lewis et al. ........................ 205/787 |
| 5,646,863 | * | 7/1997 | Morton ................................. 702/23 |

* cited by examiner

*Primary Examiner*—Patrick Assouad
*Assistant Examiner*—Edward Raymond
(74) *Attorney, Agent, or Firm*—Jones, Tullar & Cooper, P.C.

(57) ABSTRACT

A measuring device for determining the physical and/or chemical properties of gases, liquids and/or solids is provided with a computing unit. The computing unit is connected with a sensor circuit for a sensor. The computing unit furthermore is provided with program commands for processing the measured data measured by the sensor and processed by the sensor circuit. An exchangeable program module is associated with the sensor circuit in the computing unit. A modular structure of the measuring device is achieved in this way.

18 Claims, 1 Drawing Sheet

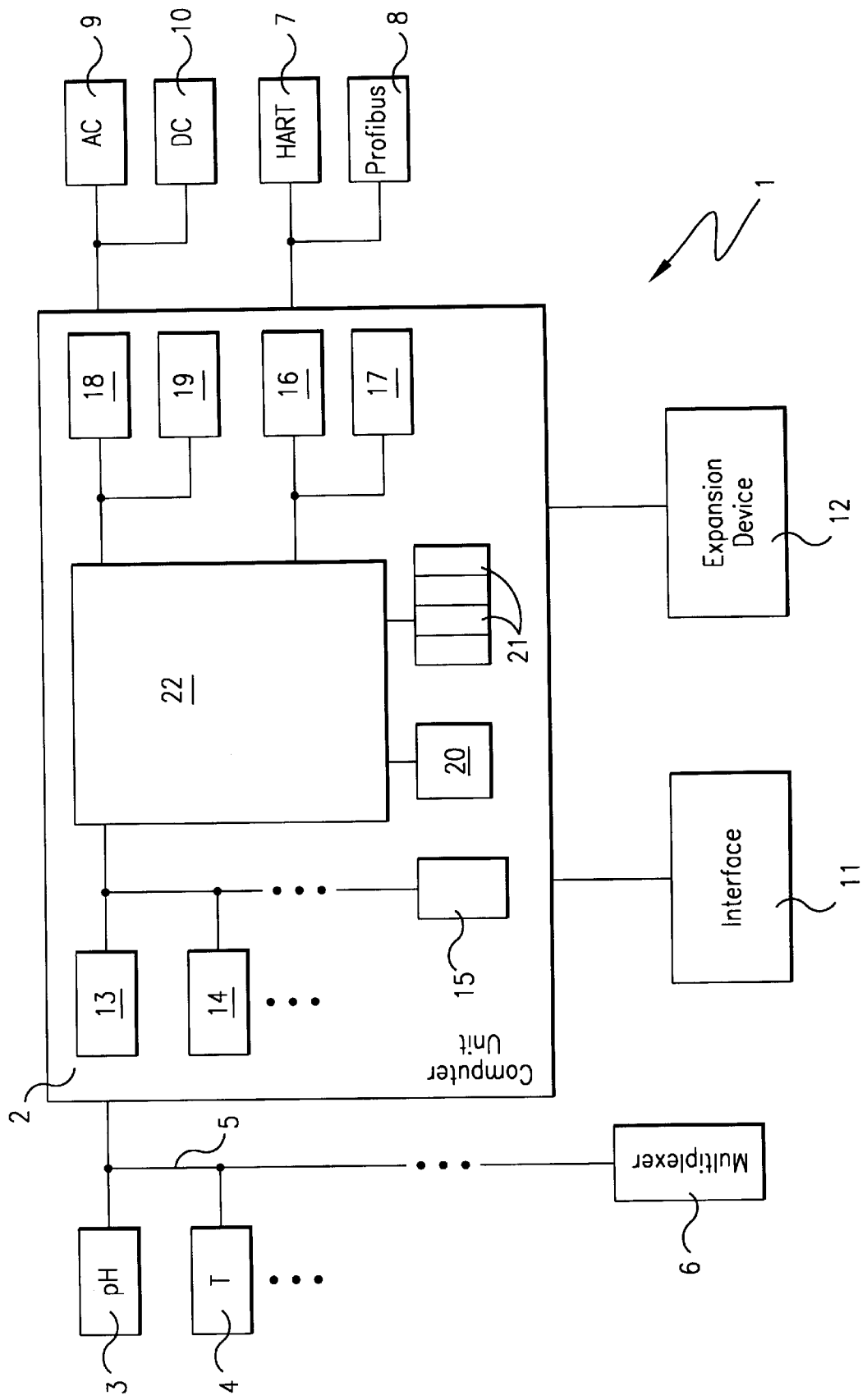

MEASURING DEVICE FOR DETERMINING PHYSICAL AND/OR CHEMICAL PROPERTIES OF GASES, LIQUIDS AND/OR SOLIDS

FIELD OF THE INVENTION

The present invention relates to a measuring device for determining physical and/or chemical properties of gases, liquids and/or solids, having a sensor, a computing unit which is connected with a sensor circuit for a sensor, and which is provided with programs for processing the measured data measured by the sensor and processed by the sensor circuit.

BACKGROUND OF THE INVENTION

In connection with such a measuring device, a pH value sensor or a temperature sensor is, for example, provided as the sensor, which is submerged in a liquid, for example. The raw data measured by the sensor are initially processed by the sensor circuit in order to be transmitted thereafter as measured data to the computing unit. The computing unit can display the measured data on an associated monitor, for example, or can pass them on via an associated external communication system to other control and/or monitoring devices.

A multitude of programming commands, which are used for processing received measured data, have been stored in the computing unit. For example, it is possible to convert the measured data in the computing unit with the aid of the programming commands. In the computing unit it is also possible, for example, to compensate sensor-dependent variations of the measured data, for example to average them, by means of the programming commands. As a whole, it is achieved with the aid of the programming commands that, as mentioned, the measured data can be displayed on the monitor or forwarded via the external communications system.

The different measuring principles of different sensors in particular result in that, on the one hand, the sensor circuits which are a part of the sensors are respectively differently constructed and that, on the other hand, the programming commands for processing the measured signals produced by the respective sensors and sensor circuits are also different.

Altogether this results in that not only a multitude of sensor circuits must be available for a multitude of sensors, but also a multitude of computing units with the respectively associated programming commands. This is extremely expensive, in particular in view of the resultant multitude of combination possibilities and the resultant management and storage of the individual components.

It is an object of the present invention to create a measuring device for determining physical and/or chemical properties of gases, liquids and/or solids, which is simpler and more cost- effectively constructed.

This object is attained by the present invention in connection with a measuring device of the type mentioned at the outset, in that an interchangeable program module in the computing unit is associated with the sensor circuit.

Thus, the present invention makes available a modularly constructed measuring device, which can be equipped with the respectively associated program module as a function of the employed sensor. It is therefore no longer required to produce, and in particular to store, a special, associated computing unit for each sensor, instead, based on the present invention it is possible to retain only a single computing unit, which can be used for all sensors with the aid of the program modules associated with the different sensors. Therefore, by means of the modularity in accordance with the present invention, the structure of the measuring device, and in particular its management and storage capability, is considerably simplified. This results in direct cost advantages.

On the one hand, the present invention can be realized by the computing unit to be connected with only a single sensor circuit, and therefore with only a single sensor. In this case it is necessary to load the program modules associated with the sensor into the computing unit. If at a later time it is intended to use a different type of sensor, this is possible in that the sensor with the associated sensor circuit is exchanged, that the program module is also removed, and that the program module associated with the new sensor is loaded into the computing unit.

In an advantageous embodiment of the present invention, two or more sensor circuits are provided, to each of which an exchangeable program module is assigned in the computing unit. Thus, in this case the computing unit is connected with two or more sensor circuits and therefore with two or more sensors. For the realization of such a measuring device it is necessary to connect the sensors with the associated sensor circuits to the computing unit and to load the program modules associated with the sensors into the computing unit. If at a later time it is intended to exchange one of the sensors with the associated sensor circuit, this is easily possible in that the associated program module is also replaced by the program module associated with the new sensor.

It is achieved by means of the following described advantageous embodiment of the present invention, that the program modules in the computing unit are not only arbitrarily exchangeable, but can also be enlarged as desired. A measuring device is created in this way, in which the number and types of sensors can be selected completely freely. With this embodiment it is also not necessary to retain a specific computing unit for each combination possibility of the measuring device. Instead, the already available computing unit can also easily be used for this embodiment in that the respective program module is loaded into the computer.

A control circuit for coupling respectively one of the sensor circuits with the computing unit is provided in an advantageous further embodiment of the present invention, wherein a program module in the computing unit is associated with the control circuit. If several sensor circuits are connected with the computing unit, the transmissions from the individual sensor circuits to the computing unit must be controlled, the control circuit, which in particular can be designed in the form of a multiplexer, is provided for this purpose. It is furthermore necessary for the control circuit itself to be controlled. For example, the control circuit must be set for the number of sensors which are connected in a particular application. A program module in the computing unit is associated with the control circuit for this purpose. For example, the control circuit is initialized and, if necessary additionally monitored, with the help of the program module.

It is particularly advantageous for the program module associated with the control circuit to be exchangeably embodied. In this case it is possible that the program module is only loaded into the computing unit if several sensors are connected to the computing unit. But if only one sensor is coupled with the computing unit, and if therefore the control circuit is not needed at all, it is possible because of the exchangeability to omit the loading into the computing unit of the program module associated with the control circuit.

In advantageous further developments of the present invention, at least one external communication system, or respectively at least one voltage supply, or respectively an interface, are provided, with which respectively one program module is associated in the computing unit. A completely modularly constructed measuring device is created in this way. Respectively one program module is associated with each one of the mentioned components, i.e. the external communication system, the voltage supply and the interface. In this regard it is therefore also not necessary to produce a special computing unit for each combination possibility, and in particular to store it. Instead, the already provided computing unit can be used, which, by the loading of the respective program module, is enabled to work together with the associated component.

In simple terms this means that each hardware component is associated with a software module in the measuring device in accordance with the present invention. If for a specific application it is necessary to provide the measuring device with a defined number and with defined types of sensors, this can be achieved in that the required hardware components are connected to the computing unit, and that the software modules associated with the hardware components are loaded into the computing unit. In this way the measuring device is individually tailored to the specific case of application. Only the hardware components and software modules necessary for this application are present in the measuring device. Especially there are no program commands provided in the computing unit, since they are not required for the present application. This provides the advantage that a customer can completely freely assemble a measuring device required for his defined application. It simultaneously provides the advantage that in spite of the mentioned freedom, the measuring device assembled in this manner only contains the actually required components and therefore can be produced in a cost-effective manner.

In connection with an advantageous embodiment of the present invention, the computing unit and the voltage supply and/or the interface are realized by means of a personal computer. Thus, no separate construction of the computing unit is required, instead the employment of a commercially available personal computer is sufficient. By means of this it is possible to considerably lower the costs of the measuring device in accordance with the present invention.

In this case it is advantageous if the personal computer is provided for executing further tasks. For example, it is possible to use the personal computer for controlling a process or the like, of which the measuring device of the present invention is a component. Here, the personal computer is simultaneously used for measurement and for controlling the same process.

In an advantageous embodiment of the present invention, the program module associated with a component is provided for performing all of the functions of the component. This means that the program module which, for example, is associated with a pH value sensor, contains all conversions, scaling, preparations of average values, etc., which are required for correctly and completely processing the measured data provided by the associated sensor circuit. In this way it is assured that, if for example the mentioned pH value sensor is used in the measuring device, by loading the associated program module all necessary steps have been taken so that the pH value sensor can work together with the computing unit.

A program module for controlling the other program modules is provided in connection with an advantageous embodiment of the present invention. This program module is, in other words, the central unit of the measuring device, from which the other program modules, and therefore the connected sensors, communication systems, etc., are controlled. In this case, control is generally understood to be the management, monitoring, etc., required for the correct functional operation of the measuring device. To a certain extent the so-called central program module is a sort of operating system of the computing unit and therefore of the measuring device.

In an advantageous further development of the present invention, each one of the program modules has a defined interface. In this way it is achieved and assured that the program module can be exchanged and/or expanded without effort.

In a further advantageous embodiment of the present invention, each program module constitutes an object in the sense of object- oriented programming. It is essentially automatically achieved by means of the mentioned object-oriented programming that at least one software module is associated with each hardware component. The modular structure of the measuring device created by the present invention is dependably and completely achieved in this way by the object-oriented programming.

In connection with a particularly advantageous embodiment of the present invention, the data associated with one of the components, in particular component-specific compensation data or the like, are stored in the component.

Thus, the component-specific compensation data are not originally stored in the computing unit. Instead, they are stored in the respective component, i.e. either in the sensor itself or in the associated sensor circuit.

When the measuring device is put into operation, the computing unit now retrieves the component-specific compensation data from the sensor, for example. Thereafter these data are available in the computing unit and can therefore be taken into consideration by the computing unit in processing the measured data provided by the sensor.

If now the sensor suffers a defect, for example because of aging, the defective sensor can be easily replaced by a new sensor. The compensation data associated with the new sensor have again been stored in the sensor itself. When the new sensor is put in operation, these new compensation data are loaded into the computing unit, so that now the computing unit can process the measured data provided by the sensor on the basis of the new compensation data. An insertion of the compensation data into the computing unit is not required. Also, a calibration of the new sensor at the place where it is used is not necessary. It can already be calibrated when it is produced. The detected component-specific compensation data can also be stored in the sensor during its manufacture.

If the mentioned compensation data are stored not in the sensor, but in the sensor circuit, the exchange of the sensor circuit, or at least the exchange of the respective memory in the sensor circuit, for example a PROM or the like, is also required in case of a defective sensor.

The use of the measuring device in accordance with the present invention is particularly advantageous in liquid and/or gas analyses, and/or when measuring moisture in liquids and/or gases.

Further characteristics, application possibilities and advantages of the present invention ensue from the following description of exemplary embodiments of the present invention represented in the drawings. Here, all described or represented characteristics constitute the subject of the present invention by themselves or in any arbitrary combination, regardless of their combination in the claims or their dependencies, as well as regardless of their wording, or respectively representation, in the description, or respectively in the drawings.

BRIEF DESCRIPTION OF THE DRAWINGS

The sole drawing FIGURE represents a schematic block circuit diagram of an exemplary embodiment of a measuring device in accordance with the present invention for liquid and/or gas analysis, and/or for the measurement of moisture in liquids and/or gases.

DESCRIPTION OF THE PREFERRED EMBODIMENTS

A measuring device 1 is represented in the drawing FIGURE, which has a computing unit 2 connected with one or several sensor circuits 3, 4. The computing unit 2 is preferably realized by means of a digital processor. Sensors can be connected, in a manner not represented, to the sensor circuits 3, 4. The sensors can be, for example, a pH value sensor, a temperature sensor, a pressure sensor, a flow-through sensor, a filling level sensor, a conductibility sensor, a sensor for measuring the oxygen content, a sensor for measuring the chlorine or chlorine dioxide content, a cloudiness sensor, a moisture sensor, or the like. In this case the associated sensor circuits 3, 4 are respectively designed as pH value sensor circuits or as temperature measuring circuits, etc. The connection between the computing unit for determining the physical and/or chemical properties of gases, liquids and/or solids and the sensor circuits 3, 4 is realized by means of an internal bus system 5 which, for example, can be an $I^2C$ bus. It is also possible to provide an interface in accordance with the so-called HART protocol, or a so- called profi-bus or the like.

It is possible for only one of the sensor circuits 3, 4, and therefore only one of the sensors, to be connected to the computing unit 2. However, it is also possible for any arbitrary number of sensor circuits 3, 4 with the associated sensors to be connected with the computing unit 2. In the last mentioned case a control circuit 6 is provided, which preferably is realized as a multiplexer. The electrical connection between the computing unit 2 and the sensor circuits 3, 4 is controlled in such a way, that only a single one of the two sensor circuits 3, 4 is always connected with the computing unit 2. The sensor circuits 3, 4 are preferably connected with the computing unit 2 in an alternating sequence.

Inter alia, at least one external communication systems 7, 8 is connected to the computing unit 2. This can, for example, be an interface in accordance with the so-called HART protocol, a so-called profi-bus, a so-called foundation field bus or another field bus.

In addition, at least one voltage supply 9, 10 is connected to the computing unit 2. Here, this can be an alternating voltage supply a.c. or a direct voltage supply d.c.

An interface 11 for an operator can furthermore be connected to the computing unit 2. This interface 11 can be, for example, a keyboard and/or a monitor.

Finally, expansion devices 12 can also be connected to the computing unit 2, which can be one or several relays, for example, which are provided for control purposes or the like.

It is particularly advantageous if at least the computing unit 2, the interface 11 and/or the voltage supply 9 are realized by a commercially available personal computer. The internal bus system 5 and the external communication system 7, 8 can be realized by means of a serial and/or a parallel interface, and/or a so-called PCMCIA card, and/or other plug-in cards of the personal computer, which can be inserted into appropriate ports of the personal computer.

In the above mentioned application of a personal computer in particular, it is possible to provide this personal computer also for the execution of evaluation, control and/or filing tasks or the like. The information from the measuring device 1 required for this can then be passed on within the personal computer. For example, the personal computer can be provided for control tasks, for which the required data are transferred within the personal computer.

It is also possible when using a personal computer to store such information, or respectively data, on a diskette or the like, and to use them from these in another personal computer, for example.

The described sensor circuits 3, 4, the control circuit 6, the external communication systems 7, 8, the supply voltages 9, 1 0, the interface 11 and the expansions 12 represent hardware components of the measuring device 1, which are connected to the computing unit 2, or are at least coupled with it. A software module is provided in the computing unit 2, which is a part of and associated with each of these hardware components.

Thus, appropriate program modules 13, 14 are associated in the computing unit 2 with the sensor circuits 3, 4. Furthermore, a control module 15 is associated in the computing unit with the control circuit 6. Appropriate communication modules 16, 17 are associated in the computing unit 2 with the external communication systems 7, 8. Appropriate voltage supply modules 18, 19 are associated in the computing unit 2 with the voltage supplies 9, 10. An interface module 20 is associated in the computing unit 2 with the interface 11, and appropriate expansion modules 21 in the computing unit 2 with the expansion devices 12.

Each one of the mentioned software modules, or respectively program modules 13, 14, 15, 16, 17, 18, 19, 20, 21 consists of a series of program commands. In this case each one of these software modules is designed in such a way that it can perform all required functions and measures necessary for the operation of the associated hardware components. For example, the sensor module 14 has been programmed in such away, that it can convert and process the measured data received from the associated sensor circuit 4 in the desired and necessary manner, so that for example thereafter a output of these measured data is possible via the interface 11, in particular the monitor, or a forwarding of these measured data via the external communication systems 7, 8.

Furthermore, each one of the software modules, or respectively program modules 13, 14, 15, 16, 17, 18, 19, 20, 21, is designed in such a way that it is accessible through a defined interface. In this case, in connection with the different types of the sensor circuits 3, 4 this interface can be determined to be the same or as a function of the type. In any case, the interface is defined in such a way that it is possible, for example, to replace the associated sensor module 14 for the same sensor circuit 4 by a sensor module 14 which has been further developed.

Each one of the software modules, i.e. each one of the program modules 13, 14, 15, 16, 17, 18, 19, 20, 21 is preferably designed in accordance with object-oriented programming. By means of this a fixed association of the individual software modules with the respectively associated hardware components is assured.

The described software modules, or respectively program modules 13, 14, 15, 16, 17, 18, 19, 20, 21, are all coupled with a central program module 22. This central program module 22 is embodied in such a way that it can address the connected software modules by means of the mentioned interfaces. Furthermore, this central program module 22 is designed in such a way that it is associated with the entire computing unit 2 in accordance with object-oriented programming. To this extent the central program module 22 represents a sort of operating system for the program modules 13, 14, 15, 16, 17, 18, 19,20,21 connected with it. The other program modules 13, 14, 15, 16, 17, 18, 19, 20, 21 are controlled and monitored etc., with the aid of the central program module 22.

The measuring device 1 as a whole is therefore constructed in the manner of a module. This modular structure relates, on the one hand, to the hardware components and on the other to the software components.

The hardware components, for example the sensor circuit 3, 4, or the control circuit 6, or also the computing unit 2 can be placed on different boards. However, it is also possible, for example, that the computing unit 2 and one of the sensor circuits 3, 4 are placed on a common board. It is also possible that the computing unit 2 and one of the sensor circuits 3 are placed on a common board, and that further sensor circuits 4 are contained on pluggable boards, for example. In this case the control circuit 6 can also be placed on a pluggable board, in which case the plug connectors, with which the pluggable boards are connected, represent the internal bus system 5.

The external communication systems 7, 8 and the voltage supplies 9, 10 can correspondingly be placed on individual or common boards.

Because of the modular structure it is possible to arbitrarily exchange and/or expand the software modules. This means that the software modules are loaded in the computing unit 2 in accordance with the layout of the hardware components. Thus, the software modules represent an image of the hardware components.

If, for example, only one sensor circuit 3 is provided, only the associated sensor module 13 is contained in the computing unit 2. If several sensor circuits 3, 4, as well as the control circuit 6 are provided, the respectively associated sensor modules 13, 14 and the control module 15 are provided in the computing unit 2.

It is therefore easily possible to expand the measuring device 1 by further sensor circuits with the associated sensor modules. It is also always possible to exchange an already present sensor circuit for another sensor circuit of the same type, or also of another type, together with the respectively associated sensor module.

Preferably an erasable and reprogrammable memory is provided in the computing unit. By means of this it is possible to exchange and/or expand software modules without a large outlay. In this way it is also possible to load a modem connected with the computing unit 2 into the computing unit 2 by remote control.

Independently of the modularity of the measuring device 1 so far described, the compensation data of the sensors which are part of the sensor circuits 3, 4 are stored either in the sensor itself or in the sensor circuits 3, 4. In this case storage is performed on the basis of a calibration in the course of the production of the respective sensor. During operation, the sensor-specific compensation data are loaded into the computing unit 2. There, the compensation data can be taken into consideration by the computing unit 2 in the processing of the measured data provided by the sensor circuits 3, 4.

If a defect occurs in one of the sensors, for example because of aging, it is now necessary to replace the defective sensor, along with the compensation data stored therein. After the new sensor with the new compensation data has been connected to the associated sensor circuit, the compensation data are again loaded into the computing unit, so that it continues to operate with the correct compensation data.

If the compensation data are stored in the associated sensor circuit, it is necessary to exchange, in addition to the defective sensor, at least the memory in which the compensation data are stored. This memory can be, for example, a so-called PROM, which can be inserted into an associated base on the sensor circuit.

What is claimed is:

1. A measuring device having a modular structure for determining the physical and/or chemical properties of gases, liquids and/or solids, comprising:

a computing unit;

a plurality of sensor circuits connected to said computing unit;

a plurality of exchangeable program modules situated in said computing unit, each associated with a respective one of said sensor circuits, and a central program module for controlling said plurality of program modules, wherein said computing unit includes programs provided by said plurality of exchangeable program modules for processing measured data measured by sensors associated with a respective one of said sensor circuits and processed by the associated sensor circuits, wherein each program module associated with a sensor circuit performs all functions of the sensor circuit, and wherein each of said plurality of exchangeable program modules constitutes an object in accordance with object-oriented programming.

2. The measuring device as defined in claim 1, further comprising:

a control circuit for coupling respectively one of said sensor circuits to said computing unit; and a program module in said computing unit associated with said control circuit.

3. The measuring device as defined in claim 1, further comprising:

at least one external communication system, and wherein said computing unit is further provided with a program module associated with a respective external communication system.

4. The measuring device as defined in claim 1, further comprising:

at least one voltage supply, and wherein said computing unit is further provided with a program module associated with a respective voltage supply.

5. The measuring device as defined in claim 1, further comprising:

interface means, and wherein said computing unit is further provided with a program module associated with said interface means.

6. The measuring device as defined in claim 5, wherein said interface means comprises a keyboard.

7. The measuring device as defined in claim 5, wherein said interface means comprises a monitor.

8. The measuring device as defined in claim 5, wherein said interface means comprises a keyboard and monitor.

9. The measuring device as defined in claim 5, wherein said computing unit, and said interface means are comprised by a personal computer.

10. The measuring device as defined in claim 1, further comprising:

at least one voltage supply, and wherein said computing unit is further provided with a program module associated with a respective voltage supply, and wherein said computing unit, and said voltage supply are comprised by a personal computer.

11. The measuring device as defined in claim 10, further comprising:

interface means, and wherein said computing unit is further provided with a program module associated with said interface means, and wherein said computing unit, said voltage supply and said interface means are comprised by a personal computer.

12. The measuring device as defined in claim 1, wherein each program module has a defined interface.

13. The measuring device as defined in claim 1, wherein each program module can be connected to said computing unit by a modem.

14. The measuring device as defined in claim 1, wherein the data specific to any of said sensor circuits and said exchangeable program modules are part thereof and stored therein.

15. The measuring device as defined in claim 1, wherein said device is employed in one of: liquid analysis; gas analysis; measuring of moisture in liquids; and measuring of moisture in gases.

16. The measuring device as defined in claim 1, wherein said sensor circuit is associated with one of: pressure sensor; flow sensor; filling level sensor; pH value sensor; cloudiness sensor; temperature sensor; sensor for measuring chlorine or chlorine dioxide content; sensor for measuring oxygen content; conductivity sensor; and moisture sensor.

17. The measuring device of claim 1, wherein each of said plurality of exchangeable program modules is a prom.

18. A measuring device having a modular structure for determining the physical and/or chemical properties of gases, liquids and/or solids, comprising:

a computing unit comprising a plurality of sensor circuits, a plurality of exchangeable program modules situated in said computing unit and a central program module for controlling said plurality of program modules, wherein each of said plurality of sensor circuits is coupled to one of said plurality of exchangeable program modules situated in said computing unit, which exchangeable program modules situated in said computing unit is then coupled to said central program module for controlling said plurality of program modules, wherein said computing unit includes programs provided by said plurality of exchangeable program modules for processing measured data measured by sensors associated with a respective one of said sensor circuits and processed by the associated sensor circuits.

* * * * *